(12) United States Patent
Ruan

(10) Patent No.: US 12,055,761 B2
(45) Date of Patent: Aug. 6, 2024

(54) WAVELENGTH DIVISION MULTIPLEXING STRUCTURE

(71) Applicant: IRIXI PHOTONICS (SUZHOU) CO., LTD., Suzhou (CN)

(72) Inventor: Yuhua Ruan, Suzhou (CN)

(73) Assignee: IRIXI PHOTONICS (SUZHOU) CO., LTD., Suzhou (CN)

( * ) Notice: Subject to any disclaimer, the term of this patent is extended or adjusted under 35 U.S.C. 154(b) by 363 days.

(21) Appl. No.: 17/632,804

(22) PCT Filed: Nov. 11, 2020

(86) PCT No.: PCT/CN2020/128007
§ 371 (c)(1),
(2) Date: Feb. 4, 2022

(87) PCT Pub. No.: WO2022/077680
PCT Pub. Date: Apr. 21, 2022

(65) Prior Publication Data
US 2022/0357517 A1 Nov. 10, 2022

(30) Foreign Application Priority Data
Oct. 12, 2020 (CN) .......................... 202011084852.5

(51) Int. Cl.
*G02B 6/293* (2006.01)
*G02B 6/34* (2006.01)
(Continued)

(52) U.S. Cl.
CPC ....... *G02B 6/29389* (2013.01); *G02B 6/2938* (2013.01); *G02B 6/34* (2013.01); *H04B 10/614* (2013.01)

(58) Field of Classification Search
CPC .... G02B 6/34; G02B 6/29365; G02B 6/4215; G02B 6/12007; G02B 6/29373; G02B 6/4246; G02B 26/0808; G02B 27/285
See application file for complete search history.

(56) References Cited

U.S. PATENT DOCUMENTS 4,948,229 A * 8/1990 Soref .................... G02F 1/1326
349/196
5,124,841 A * 6/1992 Oishi ................... G02B 27/283
359/485.02
(Continued)

FOREIGN PATENT DOCUMENTS

CN 1444070 A 9/2003
CN 103703405 A 4/2014
(Continued)

*Primary Examiner* — Ryan A Lepisto
*Assistant Examiner* — Erin D Chiem
(74) *Attorney, Agent, or Firm* — SZDC Law PC

(57) ABSTRACT

A wavelength division multiplexing structure includes: a first reflecting surface; a second reflecting surface; a first optical filter; a second optical filter; and a pretreatment device. The light that is incident on the first reflecting surface forms a first C-shaped light path in C-shaped or approximately C-shaped and enters the first optical filter. The light that is incident on the first reflecting surface forms a non-coplanar straight line with the light that is reflected by the second reflecting surface. The light that is incident on the pretreatment device forms a pretreatment light path, enters the first optical filter. The light in the pretreatment light path coincides with the light in the first C-shaped light path that is incident on the first optical filter from the second reflecting surface.

19 Claims, 10 Drawing Sheets

(51) Int. Cl.
*G02B 27/28* (2006.01)
*H04B 10/61* (2013.01)

(56) References Cited

U.S. PATENT DOCUMENTS

| | | | |
|---|---|---|---|
| 6,271,968 B1 * | 8/2001 | Dobrowolski | G02B 27/283 |
| | | | 359/485.06 |
| 7,843,644 B1 | 11/2010 | Wang et al. | |
| 9,401,773 B1 | 7/2016 | Gui et al. | |
| 2010/0290128 A1 * | 11/2010 | Sugitatsu | G02B 27/145 |
| | | | 359/634 |
| 2020/0387003 A1 * | 12/2020 | Yun | G02B 27/285 |
| 2021/0041513 A1 * | 2/2021 | Mohseni | G01R 33/032 |

FOREIGN PATENT DOCUMENTS

| | | |
|---|---|---|
| CN | 105425338 A | 3/2016 |
| CN | 110582711 A | 12/2019 |
| JP | 2001013477 A | 1/2001 |

\* cited by examiner

WAVELENGTH DIVISION MULTIPLEXING STRUCTURE

CROSS REFERENCE TO RELATED APPLICATIONS

This application is the national stage application of PCT/CN2020/128007, filed on Nov. 11, 2020, which claims priority of Chinese Patent Application No. 202011084852.5, filed Oct. 12, 2020, the entire disclosures of both of which are incorporated herein by reference.

FIELD OF THE INVENTION

The disclosure belongs to the technical field of photoelectric device, and particularly relates to a wavelength division multiplexing structure.

DESCRIPTION OF THE PRIOR ART

In the field of optical communication, optical Wavelength Division Multiplexing (WDM) technology has the functions of multiplexing optical signals of different wavelengths into the same optical fiber at the sending end for transmission, and re-separating the optical signals of different wavelengths at the receiving end, thereby saves and makes full use of optical fiber communication resources in the optical transmission process. Wavelength division multiplexer has always been irreplaceable as the core component of the optical WDM technology. With the development of 5G technology, the demand for transmission capacity of the communication data is increasing. The developments of various WDM systems are also constantly innovating, from the original CWDM transmission system to the present CWDM, MWDM, LAN WDM, DWDM and other WDM systems. As the core component, wavelength division multiplexers are also developing continuously.

Wavelength division multiplexer mainly includes dielectric wavelength division multiplexer, fiber optical tapered wavelength division multiplexer and waveguide arrayed grating wavelength division multiplexer. Dielectric wavelength division multiplexer, which uses optical dielectric films to filter light to realize light combining and splitting, realizes multi-wavelength light combining and splitting through cascade filters, is a technology which has existed for a long time but is still widely used at present. Fiber optical tapered wavelength division multiplexer, which is based on optical waveguide coupling theory, couples light beams of different wavelengths from one of two adjacent optical fibers to the other to realize light combining and splitting. Waveguide arrayed grating wavelength division multiplexer, which is based on integrated optical technology, divides light beams of different wavelengths into multiple coherent beams in the medium and then strengthen or weaken the light beams to realize light combining and splitting. Since the limit of the bandwidth of fiber optical tapered wavelength division multiplexer, the problem of the temperature stability of fiber optical tapered wavelength division multiplexer and waveguide arrayed grating wavelength division multiplexer, and the high temperature drift of waveguide arrayed grating wavelength division multiplexer, dielectric wavelength division multiplexer still has absolute advantage in practical application at present.

Dielectric wavelength division multiplexer usually includes three different types: the first type is common three-port wavelength division multiplexers, each of them is used to divide light of a certain specific wavelength to realizes multi-wavelength light combining and splitting through cascade filters; the second type is to spatially arrange a plurality of dielectric films according to the sequence of light path, and then sequentially split or combine light of each wavelength; the third type is to stick dielectric films of each wavelength on one side of glass block, which will bounce light back and forth in the glass block through the light path to realizes light combining and splitting, namely the Z-BLOCK.

With the continuous development and update of application requirements, the requirement of wavelength division multiplexer miniaturization gets higher, and even requires that wavelength division multiplexers can be integrated into other devices or small equipment. Among the above three dielectric wavelength division multiplexers, the first type has the disadvantage of large volume, high cost of a single channel and higher insertion loss; although the second type is smaller in volume than the first type, but still relatively large; the third type has the disadvantage of high raw material cost and complex process.

BRIEF SUMMARY OF THE INVENTION

The application aims to provide a wavelength division multiplexing structure, and solves the problems of the three dielectric wavelength division multiplexers in the prior art, such as large size, high cost, high insertion loss and complex process.

The purpose of the application is realized by adopting the following technical scheme:

the application provide a wavelength division multiplexing structure, comprising: a first reflecting surface; a second reflecting surface; the plane of the first reflecting surface intersects the plane of the second reflecting surface; a first optical filter, which is used to partially transmit and partially reflect the light that is incident on the first optical filter; wherein, the light transmitted through the first optical filter has a first wavelength; a second optical filter, which is used to partially transmit and partially reflect the light that is incident on the second optical filter; wherein, the light transmitted through the second optical filter has a second wavelength; a pretreatment device, which is arranged on one side of the second reflecting surface away from the first optical filter, is used to control the direction of the input and output light; the light that is incident on the first reflecting surface is reflected by the first and the second reflecting surface in sequence to form a first C-shaped light path in C-shaped or approximately C-shaped, finally enters the first optical filter; and in the first C-shaped light path, the light that is incident on the first reflecting surface is not coplanar with the light reflected by the second reflecting surface; the light that is incident on the pretreatment device sequentially transmits through the pretreatment device and the second reflecting surface to form a pretreatment light path, finally enters the first optical filter; the partial pretreatment light path in which light is incident on the first optical filter from the second reflecting surface, coincides with the partial C-shaped light path in which light is incident on the first optical filter from the second reflecting surface; the light reflected by the first optical filter is reflected by the second reflecting surface and the first reflecting surface in sequence to form a second C-shaped light path in C-shaped or approximate C-shaped and finally enters the second optical filter.

The beneficial effect of the technical scheme is: the specific spatial light path consisting of the pretreatment device, the two reflecting surfaces and the optical filter, is used to realize the wave division of light beam, and to realize the wave combination of the light beam due to the reversibility of the light path. After the light that is incident on the first reflecting surface is reflected by the first and the second reflecting surface in sequence, which forms the first C-shaped light path in C-shaped or approximately C-shaped, the light enters the first optical filter and transmits at the transmission wavelength of the first optical filter. In the first C-shaped light path, the light that is incident on the first reflecting surface is not coplanar with the light reflected by the second reflecting surface. Meanwhile, the first optical filter reflects light of the reflection wavelength back to the second reflecting surface, the transmission mode of the light incident on the second reflecting surface is similar to that of the original incident light in the first C-shaped light path: after being reflected twice by the two reflecting surfaces and forming the second C-shaped light path in a C-shape or an approximate C-shape, the light enters the second optical filter and is transmitted at the transmission wavelength; at the same time, the second optical filter reflects the light of its reflected wavelength to realize the splitting effect of the original incident light. Based on the reversibility of the light path, when the light of the first wavelength is input in the reverse direction of the first C-shaped light path and the light of the second wavelength is input in the reverse direction of the second C-shaped light path, the light of the two different wavelength will be combined and output from the input position of the original incident light, so as to realize the combining and multiplexing effect of light.

Compared with three-port wavelength division multiplexer, the wavelength division multiplexing structure has the advantages of: small volume, low insertion loss and widely used because of its high integration level; only need to arrange two optical filters in the area where the light enters and emits, and don't have to process the two reflecting surfaces, and for conventional applications, there is no need to coat different areas of the core devices, which solve the problem of the complex process of materials and the partition coating of the core devices, so as to reduce the material processing difficulty, technological requirements and the cost; in addition, the specific C-shaped or approximately C-shaped light path that is formed after the twice reflection of the two reflecting surfaces, can directly realize the light emitting on the same side of the incident light, so as to solve the problem of the existing Z-BLOCK scheme that the common port cannot be distributed on the same side with other ports. The wavelength division multiplexing structure also uses the pretreatment device to realize the light emitting on the different sides of the incident light. Since the partial pretreatment light path in which light is incident on the first optical filter from the second reflecting surface coincides with the partial C-shaped light path in which light is incident on the first optical filter from the second reflecting surface, the pretreatment device can split the incident light, and light of different wavelengths can be combined and emitted from the pretreatment. Therefore, the common port can be arranged on the same side or different side with other ports according to the actual application requirements.

In some optional embodiments, the pretreatment device comprises a prism, which does not intersect the second C-shaped light path. The beneficial effect of the technical scheme is: the prism technology is mature and widely used, users can choose the appropriate prism to change the direction of incident light in practical application, so as to meet the functioning demand.

In some optional embodiments, the refractive index of the prism is the same as that of the second reflecting surface, and the first side of the prism is attached to the second reflecting surface. The beneficial effect of the technical scheme is: the light that is incident from the prism on the second reflecting surface will not be reflected of refracted when the refraction index of the prism is the same as that of the second reflecting surface, so as to make users conveniently adjust the direction of the incident light.

In some optional embodiments, the pretreatment device further comprises an attenuator, which is arranged between the prism and the second reflecting surface; and the attenuator is used to control the intensity of light output from the attenuator. The beneficial effect of the technical scheme is: the intensity of the incident light of the second reflecting surface can be controlled by the attenuator.

In some optional embodiments, the attenuator comprises a first polarizer, a second polarizer, and a liquid crystal material that is arranged between the first and second polarizer. The beneficial effect of the technical scheme is: using two polarizers and liquid crystal materials to provide attenuation function, of which the process is mature and easy to realized.

In some optional embodiments, the attenuator performs an optical attenuation function by using an electro-absorption material. The beneficial effect of the technical scheme is: using the special properties of the electro-absorption materials to provide the attenuation function of light.

In some optional embodiments, the attenuator is used to provide an optical switching function. The beneficial effect of the technical scheme is: the pretreatment light path can be regarded as disconnected when the attenuator makes the intensity of the light attenuated to reach or close to 100%.

In some optional embodiments, the pretreatment device further comprises a switchable optical device, which is arranged between the prism and the second reflecting surface; the switchable optical device switches between a reflection state and a transmission state to provide an optical switching function, thereby makes the light in the pretreatment light path or the light in the first C-shaped light path enter the first optical filter. The beneficial effect of the technical scheme is: the 1×2 optical switching function is realized by switching the switchable optical device between the reflection state and transmission state; wherein, in the transmission state, light in the pretreatment light path transmits through the second reflecting surface and then enters the first optical filter; in the reflection state, light in the first C-shaped light path is reflected by the second reflecting surface and enters the first optical filter.

In some optional embodiments, the pretreatment device further comprises a variable refractive index device, which is arranged between the prism and the second reflecting surface; the variable refractive index device provides an optical switching function by using a variable refractive index material to make the light in the pretreatment light path or the light in the first C-shaped light path enter the first optical filter. The beneficial effect of the technical scheme is: the 1×2 optical switching function is realized by the variable of the refractive index of the variable refractive index materials, which makes the light in the pretreatment light path totally reflected instead of entering the first optical filter before the light is incident on the second reflecting surface, or makes the light that is reflected by the first reflecting surface in the first C-shaped light path directly transmit the second reflecting surface but not reflected to the first optical filter, so as to make the light in the pretreatment light path or the light in the first C-shaped light path enter the first optical filter.

In some optional embodiments, the pretreatment device further comprises a photodetector and a splitting film that is plated on the second side of the prism; the splitting film is used to split the light that is incident on the splitting film into a first portion and a second portion, the first portion is output to the second reflecting surface, and the second portion serves as an input source of the photodetector. The beneficial effect of the technical scheme is: using the splitting film to split the light, so as to detect the parameters of the light that is incident on the splitting film.

In some optional embodiments, the wavelength division multiplexing structure further comprises third to Nth optical filters, wherein, N is an integer greater than 2.

When N is odd: the light reflected by the 2P−1th optical filter is reflected by the second reflecting surface and the first reflecting surface in sequence to form a 2Pth C-shaped light path in C-shaped or approximately C-shaped and finally enters the 2Pth optical filter; wherein, p is a positive integer, and 2P+1≤N; the 2Pth optical filter is used to partial transmit and partial reflect the light that is incident on the 2Pth optical filter; wherein, the light transmitted through the 2Pth optical filter is of the 2Pth wavelength; the light reflected by the 2Pth optical filter is reflected by the first reflecting surface and the second reflecting surface in sequence to form a 2P+1 C-shaped light path in C-shaped or approximately C-shaped and finally enters the 2P+1th optical filter; the 2P+1th optical filter is used to partial transmit and partial reflect the light that is incident on the 2P+1th optical filter; wherein, the light transmitted through the 2P+1th optical filter has the 2P+1th wavelength.

When N is even: the light reflected by the 2Qth optical filter is reflected by the first reflecting surface and the second reflecting surface in sequence to form a 2Q+1th C-shaped light path in C-shaped or approximately C-shaped and finally enters the 2Q+1th optical filter; wherein, q is a positive integer, and 2Q+2th≤N; the 2Q+1th optical filter is used to partial transmit and partial reflect the light that is incident on the 2Q+1th optical filter; wherein, the light transmitted through the 2Q+1th optical filter has the 2Q+1th wavelength; the light reflected by the 2Q+1th optical filter is reflected by the second reflecting surface and the first reflecting surface in sequence to form a 2Q+2th C-shaped light path in C-shaped or approximately C-shaped and finally enters the 2Q+2th optical filter; the 2Q+2th optical filter is used to partial transmit and partial reflect the light that is incident on the 2Q+2th optical filter; wherein, the light transmitted through the 2Q+2th optical filter has the 2Q+2th wavelength.

The beneficial effect of the technical scheme is: the wave division is realized by using more optical filters to gradually divide the original incident light into different wavelengths, which makes the original incident light reflected by one of the optical filters and enter one of the two reflecting surfaces, and then enter the next optical filter after reflected twice by the two reflecting surfaces. Because of the reversibility of the light path, when the light of each wavelength is respectively input from the corresponding optical filter along the opposite direction of the transmission light path, the light of these wavelengths will be combined and output from the input position of the original incident light, so as to realize the wave combination. Wherein, the light, which is reflected by the first optical filter, the third optical filter, the fifth optical filter and other odd-numbered optical filters, respectively enters the second optical filter, the fourth optical filter, the sixth optical filter and other even-numbered optical filters, after being reflected twice by the second and the first reflecting surface; the light, which is reflected by the second optical filter, the fourth optical filter, the sixth optical filter and other even-numbered optical filters, respectively enters the third optical filter, the fifth optical filter and other odd-numbered optical filters, after being reflected twice by the first and second reflecting surface.

In some optional embodiments, the first reflecting surface is perpendicular to the second reflecting surface.

When N is odd, the centers of the first optical filter, the third to the Nth optical filter are sequentially connected to form a first connecting line; the centers of the second optical filter, the fourth to the N−1th optical filter are sequentially connected to form a second connecting line; the first connecting line and the second connecting line are two parallel straight lines.

When N is even, the centers of the first optical filter, the third to the N−1th optical filter are sequentially connected to form a third connecting line; the centers of the second optical filter, the fourth to the N−1th optical filter are sequentially connected to form a fourth connecting line; the third connecting line and the fourth connecting line are two parallel straight lines.

The beneficial effect of the technical scheme is: the optical input and output ports can be integrated in linear array and planar array, of which the port density is higher than that of the existing Z-Block scheme. For example, all odd-numbered optical filters or even-numbered optical filters can be changed to total reflecting films, and then the output port can be integrated in linear array.

In some optional embodiments, the wavelength division multiplexing structure further comprises a first transmitting surface; the light that is incident on the first transmitting surface is transmitted through the first transmitting surface, reflected by the first reflecting surface and reflected by the second reflecting surface in sequence and finally enters the first optical filter. The beneficial effect of the technical scheme is: according to the requirements in practical application, the original incident light can be transmitted through the first transmitting surface before being incident on the first reflecting surface.

In some optional embodiments, the wavelength division multiplexing structure further comprises a second transmitting surface; the first optical filter is arranged on one side of the second transmitting surface away from the second reflecting surface; the light that is incident on the first reflecting surface is reflected by the first reflecting surface, reflected by the second reflecting surface and transmitted through the second transmitting surface in sequence and finally enters the first optical filter. The beneficial effect of the technical scheme is: according to the requirements in practical application, the light can be transmitted through the second transmitting surface before being incident on the first optical filter.

In some optional embodiments, the wavelength division multiplexing structure further comprises a third transmitting surface; the first optical filter is arranged on one side of the third transmitting surface away from the second reflecting surface; the light that is incident on the third transmitting surface is transmitted through the third transmitting surface, reflected by the first reflecting surface, reflected by the second reflecting surface and transmitted through the third transmitting surface in sequence and finally enters the first optical filter. The beneficial effect of the technical scheme is: according to the requirements in practical application, the original incident light can be transmitted through the third transmitting surface before being incident on the first reflecting surface, and the light can be transmitted through the third transmitting surface before being incident on the first optical filter.

In some optional embodiments, the first reflecting surface, the second reflecting surface and the third transmitting surface are three sides of a triangular prism; wherein, the three side edges of the triangular prism are parallel to each other. The beneficial effect of the technical scheme is: using the prism that comprises the first reflecting surface, the second reflecting surface and the third transmitting surface to provide the wavelength division multiplexing function, and using the prism that is comprised of innovative light path structure to realize the reversion transmission of the light combining path and light splitting path of WDM.

In some optional embodiments, the first reflecting surface is perpendicular to the second reflecting surface. The beneficial effect of the technical scheme is: when the two reflecting surfaces are perpendicular to each other, the light incident on the first reflecting surface and the light reflected by the second reflecting surface are parallel to each other, so as to arrange multiple optical filters on the third reflecting surface in the form of patches.

In some optional embodiments, the cross-section of the triangular prism in the direction perpendicular to the side edges is an isosceles right triangle. The beneficial effect of the technical scheme is: using the specific spatial light path composed of isosceles right-angle prism and dielectric optical filter to realize the wave combining and splitting effect.

In some optional embodiments, with a plane perpendicular to the side edges as a first plane, the light that is incident on the first reflecting surface is not parallel to the side edges; and an acute angle formed between a projection of the light that is incident on the first reflecting surface on the first plane and the first reflecting surface is 45°. The beneficial effect of the technical scheme is: when the acute angle formed between the projection of the light that is incident on the first reflecting surface on the first plane and the first reflecting surface is 45°, the acute angle formed between the projection of the light that is reflected by the first reflecting surface on the first plane 701 and the second reflecting surface is also 45°, which is beneficial to realize the total reflection of light in practical applications.

BRIEF DESCRIPTION OF THE DRAWINGS

The present application is further described below with reference to the figures and examples.

DETAILED DESCRIPTION OF THE PREFERRED EMBODIMENTS

The present application is further described with reference to the accompanying drawings and the detailed description, and it should be noted that, in the present application, the embodiments or technical features described below may be arbitrarily combined to form a new embodiment without conflict.

Figure 1:
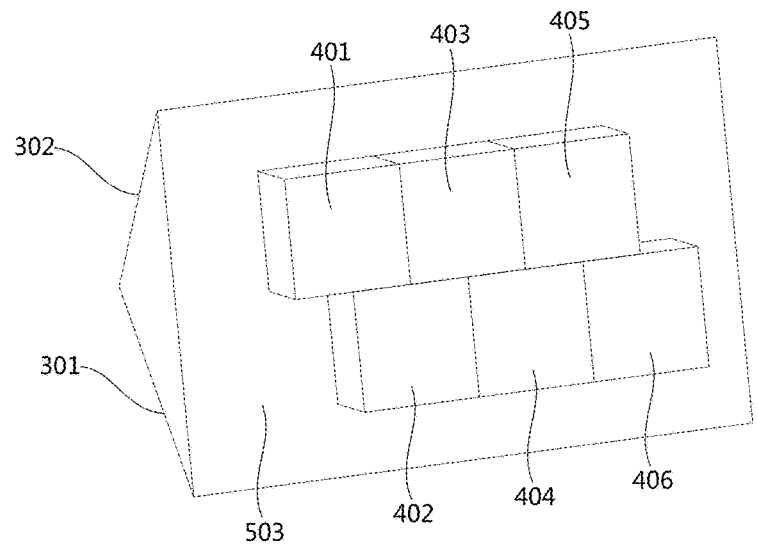
FIG. 1 is a schematic structural diagram of a wavelength division multiplexing structure provided in an embodiment of the present application.
Figure 2:
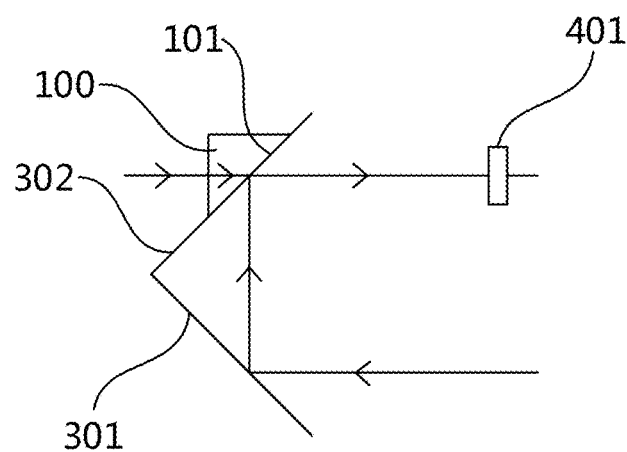
FIG. 2 is a side view of a wavelength division multiplexing structure provided by an embodiment of the present application.

Referring to FIGS. 1 and 2, an embodiment of the present application provides a wavelength division multiplexing structure comprising a first reflecting surface 301, a second reflecting surface 302, a first optical filter 401, a second optical filter 402, and a pretreatment device (not shown in FIG. 1).

The first reflecting surface 301 is used to reflect light that is incident on it, and the second reflecting surface 302 is used to reflect light that is incident on it. The first reflecting surface 301 can be a reflector, preferably a total-reflection mirror. The second reflecting surface 302 may be a mirror, preferably a total-reflection mirror.

The plane of the first reflecting surface 301 intersects the plane of the second reflecting surface 302. Which means the first reflecting surface 301 is not parallel with the second reflecting surface 302, the first reflecting surface 301 and the second reflecting surface 302 can intersect and form an intersection line as shown in FIGS. 3 to 5, or can be non-intersecting as shown in FIG. 6.

Figure 3:
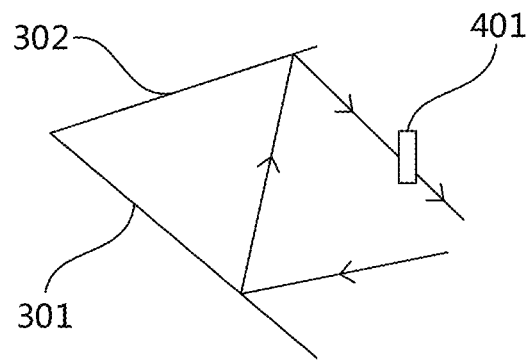
FIG. 3 is a side view of a wavelength division multiplexing structure with light exiting on the same side as the incident light provided in an embodiment of the present application.
Figure 4:
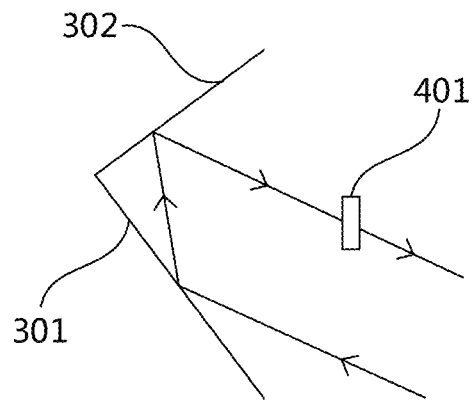
FIG. 4 is a side view of a wavelength division multiplexing structure with light exiting on the same side as the incident light provided in an embodiment of the present application.
Figure 5:
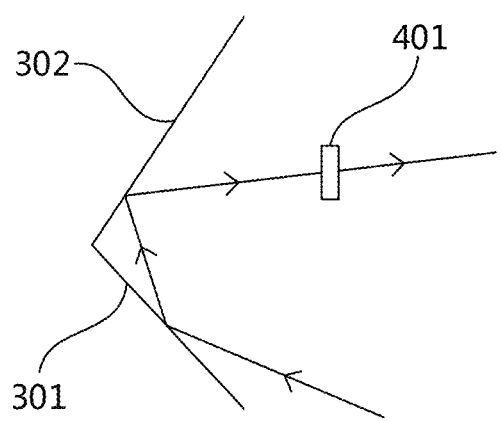
FIG. 5 is a side view of a wavelength division multiplexing structure with light exiting on the same side as the incident light provided in an embodiment of the present application.
Figure 6:
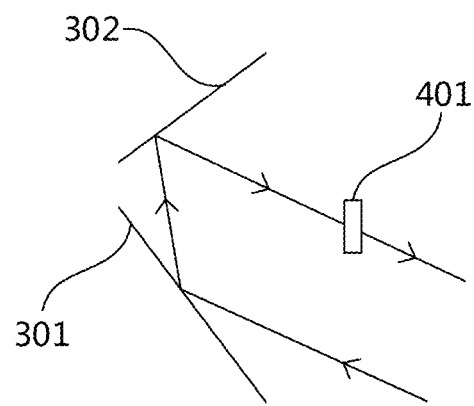
FIG. 6 is a side view of a wavelength division multiplexing structure with light exiting on the same side as the incident light provided in an embodiment of the present application.

As shown in FIG. 3, the included angle formed by the first reflecting surface 301 and the second reflecting surface 302 can be an acute angle; as shown in FIG. 4, the included angle formed by the first reflecting surface 301 and the second reflecting surface 302 can be a right angle; as shown in FIG. 5, the included angle formed by the first reflecting surfaces 301 and the second reflecting surfaces 302 can be an obtuse angle.

As shown in FIG. 4, the included angle formed by the first reflecting surface 301 and the second reflecting surface 302 is preferably a right angle, in which case the first reflecting surface 301 and the second reflecting surface 302 are perpendicular to each other. When the two reflecting surfaces are perpendicular to each other, the light, which is perpendicular to the intersecting line of the two reflecting surfaces and is incident on the first reflecting surface 301, is parallel to the light that is reflected by the second reflecting surface 302.

The first optical filter 401 is used to partially transmit and partially reflect the light that is incident on the first optical filter 401; wherein, the light transmitted through the first optical filter 401 has the first wavelength. Partially transmission and partially reflection mean that part of the light is transmitted and part of the light is reflected, or mean that part of the light is transmitted and rest of the light is reflected.

The second optical filter 402 is used to partially transmit and partially reflect the light that is incident on the second optical filter 402; wherein, the light transmitted through the second optical filter has a second wavelength.

The pretreatment device, which is arranged on one side of the second reflecting surface 302 away from the first optical filter 401, is used to control the direction of the input and output light.

Referring to FIGS. 3 to 6, the light that is incident on the first reflecting surface 301 is reflected by the first reflecting surface 301 and the second reflecting surface 302 in sequence to form a first C-shaped light path in C-shaped or approximately C-shaped, finally enters the first optical filter 401. As shown in the FIG. 7, in the first C-shaped light path, the light that is incident on the first reflecting surface 301 is not coplanar with the light reflected by the second reflecting surface 302, which forms different planes straight line. After being reflected by the first reflecting surface 301 and the second reflecting surface 302 in sequence, the light that is incident on the first reflecting surface 301 enters the first optical filter 401 and transmits at the transmission wavelength of the first optical filter 401, namely the light of the first wavelength.

Referring to FIG. 2, the light that is incident on the pretreatment device sequentially transmits through the pretreatment device and the second reflecting surface 302 to form a pretreatment light path, finally enters the first optical filter 401. the partial pretreatment light path in which light is incident on the first optical filter 401 from the second reflecting surface 302, coincides with the partial C-shaped light path in which light is incident on the first optical filter 401 from the second reflecting surface 302. Wherein, the pretreatment device may include the prism 100 as shown in FIG. 2. The structure formed by the first reflecting surface 301, the second reflecting surface 302 and at least one optical filter is first described below, and the part of the pretreatment device will be described later.

Figure 7:
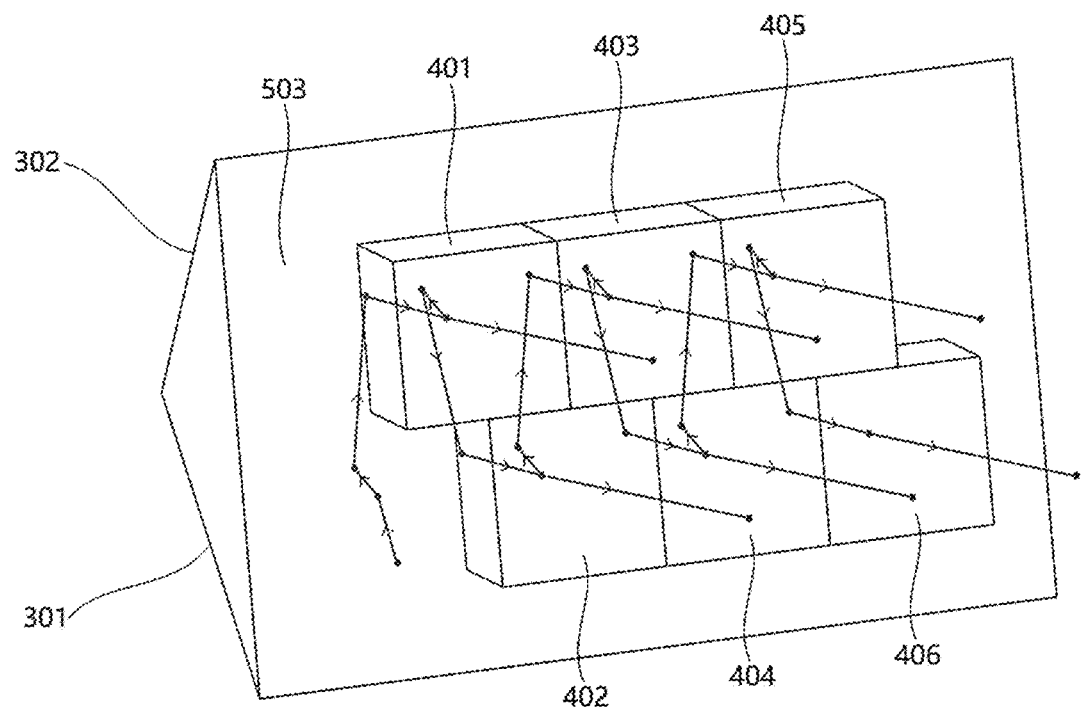
FIG. 7 is a light path schematic diagram of a wavelength division multiplexing architecture provided by an embodiment of the present application.

Referring to FIG. 7, the light reflected by the first optical filter 401 is reflected by the second reflecting surface 302 and the first reflecting surface 301 in sequence to form a second C-shaped light path in C-shaped or approximate C-shaped and finally enters the second optical filter 402. The first optical filter 401 reflects light of the reflection wavelength back to the second reflecting surface 302, the transmission mode of the light incident on the second reflecting surface 302 is similar to that of the original incident light in the first C-shaped light path: after being reflected twice by the two reflecting surfaces and forming the second C-shaped light path in a C-shape or an approximate C-shape, the light enters the second optical filter 402 and is transmitted at the transmission wavelength; at the same time, the second optical filter 402 reflects the light of its reflected wavelength to realize the splitting effect of the original incident light.

Therefore, the specific spatial light path consisting of the two reflecting surfaces and the optical filter, is used to realize the wave division of light beam, and to realize the wave combination of the light beam due to the reversibility of the light path. Specifically, the light of the first wavelength enters the reverse direction of the first C-shaped light path and the light of the second wavelength is input in the reverse direction of the second C-shaped light path, the light of the two different wavelength will be combined and output from the input position of the original incident light, so as to realize the combining and multiplexing effect of light. Specifically, inputting the of the first wavelength along the opposite direction of the first C-shaped light path by the first optical filter 401, and inputting the light of the second wavelength along the second C-shaped light path by the second optical filter 402. Thus, the two wavelengths of light are combined and output from the input position of the original incident light, and the effect of multiplexing the light is achieved.

Compared with three-port wavelength division multiplexer, the wavelength division multiplexing structure has the advantages of: small volume, low insertion loss and widely used because of its high integration level. The wavelength division multiplexing structure requires no additional processing on the two reflecting surfaces, and only need to arrange two optical filter in the area where the light enters and emits. For conventional applications, there is no need to coat different areas of the main devices, which solves the problem of the complex process of materials and the partition coating of the main devices, so as to reduce the material processing difficulty, technological requirements and the cost. In addition, the specific C-shaped or approximately C-shaped light path that is formed after the twice reflection of the two reflecting surfaces, can directly realize the light emitting on the same side of the incident light, so as to solve the problem of the existing Z-BLOCK scheme that the common port cannot be distributed on the same side with other ports.

In some optional embodiments, the wavelength division multiplexing structure further comprises the third optical filter 403, and the forth to Nth optical filters, wherein, N is an integer greater than 2, could be 3, 4, 6, 10, 11 or any other integer greater than 2. The cases where N is odd and even are discussed separately below.

In the first case, when N is odd:

The light reflected by the 2P−1th optical filter is reflected by the second reflecting surface 302 and the first reflecting surface 301 in sequence to form a 2Pth C-shaped light path in C-shaped or approximately C-shaped and finally enters the 2Pth optical filter; wherein, p is a positive integer, and 2P+1≤N.

The 2Pth optical filter is used to partial transmit and partial reflect the light that is incident on the 2Pth optical filter; wherein, the light transmitted through the 2Pth optical filter is of the 2Pth wavelength; the light reflected by the 2Pth optical filter is reflected by the first reflecting surface 301 and the second reflecting surface 302 in sequence to form a 2P+1 C-shaped light path in C-shaped or approximately C-shaped and finally enters the 2P+1th optical filter.

The 2P+1th optical filter is used to partial transmit and partial reflect the light that is incident on the 2P+1th optical filter; wherein, the light transmitted through the 2P+1th optical filter has the 2P+1th wavelength.

For example, when N is 3, P can only be 1, and then the above scheme is:

The light reflected by the first optical filter 401 is reflected by the second reflecting surface 302 and the first reflecting surface 301 in sequence to form the second C-shaped light path in C-shaped or approximately C-shaped and finally enters the second optical filter 402.

The second optical filter 402 is used to partial transmit and partial reflect the light that is incident on the second optical filter 402; the light reflected by the second optical filter 402 is reflected by the first reflecting surface 301 and the second reflecting surface 302 in sequence to form the third C-shaped light path in C-shaped or approximately C-shaped and finally enters the third optical filter 403.

The third optical filter 403 is used to partial transmit and partial reflect the light that is incident on the third optical filter 403; wherein, the light transmitted by the third optical filter 403 has a third wavelength.

For example, when N is 7, P can be 1, 2 or 3, and then the above scheme is:

The light reflected by the first optical filter 401 is reflected by the second reflecting surface 302 and the first reflecting surface 301 in sequence to form the second C-shaped light path in C-shaped or approximately C-shaped and finally enters the second optical filter 402.

The second optical filter 402 is used to partial transmit and partial reflect the light that is incident on the second optical filter 402; the light reflected by the second optical filter 402 is reflected by the first reflecting surface 301 and the second reflecting surface 302 in sequence to form the third C-shaped light path in C-shaped or approximately C-shaped and finally enters the third optical filter 403.

The third optical filter 403 is used to partial transmit and partial reflect the light that is incident on the third optical filter 403; the light reflected by the third optical filter 403 is reflected by the second reflecting surface 302 and the first reflecting surface 301 in sequence to form the forth C-shaped light path in C-shaped or approximately C-shaped and finally enters the forth optical filter 404.

The forth optical filter 404 is used to partial transmit and partial reflect the light that is incident on the forth optical filter 404; the light reflected by the forth optical filter 404 is reflected by the first reflecting surface 301 and the second reflecting surface 302 in sequence to form the fifth C-shaped light path in C-shaped or approximately C-shaped and finally enters the forth optical filter 405.

The fifth optical filter 405 is used to partial transmit and partial reflect the light that is incident on the fifth optical filter 405; the light reflected by the fifth optical filter 405 is reflected by the second reflecting surface 302 and the first reflecting surface 301 in sequence to form the sixth C-shaped light path in C-shaped or approximately C-shaped and finally enters the sixth optical filter 406.

The sixth optical filter 406 is used to partial transmit and partial reflect the light that is incident on the sixth optical filter 406; the light reflected by the sixth optical filter 406 is reflected by the first reflecting surface 301 and the second reflecting surface 302 in sequence to form the seventh C-shaped light path in C-shaped or approximately C-shaped and finally enters the seventh optical filter (not shown).

The seventh optical filter is used to partial transmit and partial reflect the light that is incident on the seventh optical filter; wherein, the light transmitted by the seventh optical filter has a seventh wavelength.

In the second case, when N is even:

The light reflected by the 2Qth optical filter is reflected by the first reflecting surface 301 and the second reflecting surface 302 in sequence to form a 2Q+1th C-shaped light path in C-shaped or approximately C-shaped and finally enters the 2Q+1th optical filter; wherein, Q is a positive integer, and 2Q+2th≤N.

The 2Q+1th optical filter is used to partial transmit and partial reflect the light that is incident on the 2Q+1th optical filter; wherein, the light transmitted through the 2Q+1th optical filter has the 2Q+1th wavelength. The light reflected by the 2Q+1th optical filter is reflected by the second reflecting surface 302 and the first reflecting surface 301 in sequence to form a 2Q+2th C-shaped light path in C-shaped or approximately C-shaped and finally enters the 2Q+2th optical filter.

The 2Q+2th optical filter is used to partial transmit and partial reflect the light that is incident on the 2Q+2th optical filter; wherein, the light transmitted through the 2Q+2th optical filter has the 2Q+2th wavelength.

For example, when N is 4, P can only be 1, and then the above scheme is:

The light reflected by the second optical filter 402 is reflected by the first reflecting surface 301 and the second reflecting surface 302 in sequence to form a third C-shaped light path in C-shaped or approximately C-shaped and finally enters the third optical filter 403.

The third optical filter 403 is used to partial transmit and partial reflect the light that is incident on the third optical filter 403; wherein, the light transmitted through the third optical filter 403 has the third wavelength. The light reflected by the third optical filter 403 is reflected by the second reflecting surface 302 and the first reflecting surface 301 in sequence to form a forth C-shaped light path in C-shaped or approximately C-shaped and finally enters the forth optical filter 404.

The forth optical filter 404 is used to partial transmit and partial reflect the light that is incident on the forth optical filter 404; wherein, the light transmitted through the forth optical filter 404 has the forth wavelength.

For example, when N is 6, P can be 1 or 2, and then the above scheme is:

The light reflected by the second optical filter 402 is reflected by the first reflecting surface 301 and the second reflecting surface 302 in sequence to form a third C-shaped light path in C-shaped or approximately C-shaped and finally enters the third optical filter 403.

The third optical filter 403 is used to partial transmit and partial reflect the light that is incident on the third optical filter 403; wherein, the light transmitted through the third optical filter 403 has the third wavelength. The light reflected by the third optical filter 403 is reflected by the second reflecting surface 302 and the first reflecting surface 301 in sequence to form a forth C-shaped light path in C-shaped or approximately C-shaped and finally enters the forth optical filter 404.

The forth optical filter 404 is used to partial transmit and partial reflect the light that is incident on the forth optical filter 404; wherein, the light transmitted through the forth optical filter 404 has the forth wavelength. The light reflected by the forth optical filter 404 is reflected by the first reflecting surface 301 and the second reflecting surface 302 in sequence to form a fifth C-shaped light path in C-shaped or approximately C-shaped and finally enters the fifth optical filter 405.

The fifth optical filter 405 is used to partial transmit and partial reflect the light that is incident on the fifth optical filter 405; wherein, the light transmitted through the fifth optical filter 405 has the forth wavelength. The light reflected by the fifth optical filter 405 is reflected by the second reflecting surface 302 and the first reflecting surface 301 in sequence to form a sixth C-shaped light path in C-shaped or approximately C-shaped and finally enters the sixth optical filter 406.

The sixth optical filter 406 is used to partial transmit and partial reflect the light that is incident on the sixth optical filter 406; wherein, the light transmitted through the sixth optical filter 406 has the sixth wavelength.

Therefore, wave division can be realized by using more optical filters to gradually divide the original incident light into different wavelengths, which makes the original incident light reflected by one of the optical filters and enter one of the two reflecting surfaces, and then enter the next optical filter after reflected twice by the two reflecting surfaces. Because of the reversibility of the light path, when the light of each wavelength is respectively input from the corresponding optical filter along the opposite direction of the transmission light path, the light of these wavelengths will be combined and output from the input position of the original incident light, so as to realize the wave combination. For example, referring to FIG. 7, the light reflected by the first optical filter 401, the third optical filter 403, the fifth optical filter 405 and other odd-number optical filters, respectively enters the second optical filter 402, the fourth optical filter 404, the sixth optical filter 406 and other even-numbered optical filters, after being reflected twice by the second reflecting surface 302 and the first reflecting surface 301. And the light reflected by the second optical filter 402, the fourth optical filter 404, the sixth optical filter 406 and other even-numbered optical filters, respectively enters the third optical filter 403, the fifth optical filter 405 and other odd-numbered optical filters, after being reflected twice by the first reflecting surface 301 and the second reflecting surface 302.

In some optional embodiments, the first reflecting surface 301 is perpendicular to the second reflecting surface 302. When N is odd, the centers of the first optical filter 401, the third to the Nth optical filter are sequentially connected to form a first connecting line. The centers of the second optical filter 402, the fourth to the N-1th optical filter are sequentially connected to form a second connecting line. The first connecting line and the second connecting line are two parallel straight lines. When N is even, the centers of the first optical filter 401, the third to the N-1th optical filter are sequentially connected to form a third connecting line. The centers of the second optical filter 402, the fourth to the N-1th optical filter are sequentially connected to form a fourth connecting line. The third connecting line and the fourth connecting line are two parallel straight lines. Thus, the optical input and output ports can be integrated in linear array and planar array, of which the port density is higher than that of the existing Z-Block scheme. For example, referring to FIG. 8, when N is 6, the centers of the first optical filter 401, the third optical filter 403 and the fifth optical filter 405 are sequentially connected to form the third connecting line 801. The centers of the second optical filter 402, the fourth optical filter 404 and the sixth optical filter 406 are sequentially connected to form the fourth connecting line 802. The third connecting line 801 and the fourth optical filter 404 are two parallel straight lines. In the concrete implementation, all odd-numbered optical filters (the optical filters that is used to form the first or the third connecting line) or even-numbered optical filters (the optical filters that is used to form the second or the forth connecting line) can be changed to total reflecting films, and then the output port can be integrated in linear array.

Figure 9:
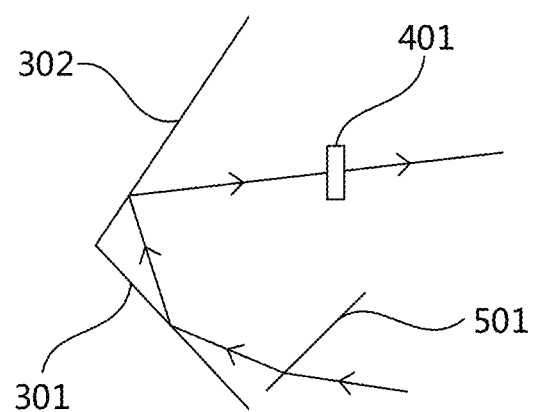
FIG. 9 is a side view of a wavelength division multiplexing structure with light exiting on the same side as the incident light provided in an embodiment of the present application.

In some optional embodiments, as shown in FIG. 9, the wavelength division multiplexing structure further comprises the first transmitting surface 501. The light that is incident on the first transmitting surface 501 is transmitted through the first transmitting surface 501, reflected by the first reflecting surface 301 and the second reflecting surface 302 in sequence, and finally enters the first optical filter 401. Thus, based on the requirements in practical application, the original incident light can be transmitted through the first transmitting surface 501 before being incident on the first reflecting surface 301.

Figure 10:
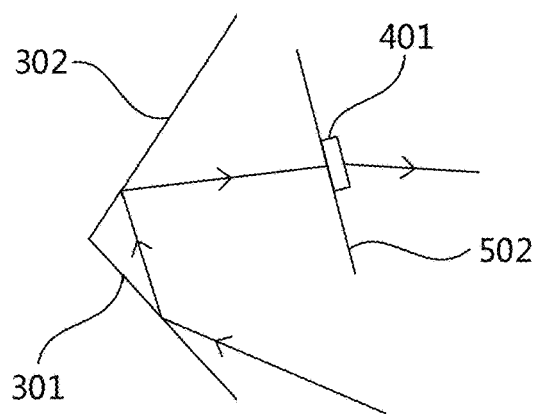
FIG. 10 is a side view of a wavelength division multiplexing structure with light exiting on the same side as the incident light provided in an embodiment of the present application.

In some optional embodiments, as shown in FIG. 10, the wavelength division multiplexing structure further comprises the second transmitting surface 502. The first optical filter 401 is arranged on one side of the second transmitting surface 502 away from the second reflecting surface 302. The light that is incident on the first reflecting surface 301 is reflected by the first reflecting surface 301, reflected by the second reflecting surface 302 and transmitted through the second transmitting surface 502 in sequence and finally enters the first optical filter 401. Thus, based on the requirements in practical application, the light can be transmitted through the second transmitting surface 502 before being incident on the first optical filter 401. When the wavelength division multiplexing structure comprises multiple optical filters, all the optical filters can be arranged on the side of the second transmitting surface 502 away from the second reflecting surface 302, so as to make the light be transmitted through the second transmitting surface 502 before being incident on each optical filter. Preferably, multiple optical filters are arranged on the second reflecting surface 502 in the form of patches.

Figure 11:
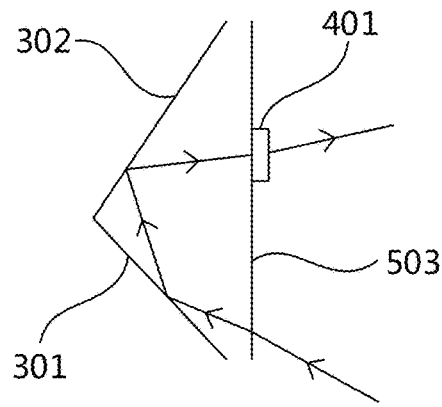
FIG. 11 is a side view of a wavelength division multiplexing structure with light exiting on the same side as the incident light provided in an embodiment of the present application.

In some optional embodiments, as shown in FIG. 11, the wavelength division multiplexing structure further comprises the third transmitting surface 503. The first optical filter 401 is arranged on one side of the third transmitting surface 503 away from the second reflecting surface 302. The light that is incident on the third transmitting surface 503 is transmitted through the third transmitting surface 503, reflected by the first reflecting surface 301, reflected by the second reflecting surface 302 and transmitted through the third transmitting surface 503 in sequence and finally enters the first optical filter 401. Thus, based on the requirements in practical application, the original incident light can be transmitted through the third transmitting surface 503 before being incident on the first reflecting surface 301, and the light can be transmitted through the third transmitting surface 503 before being incident on the first optical filter 401. When the wavelength division multiplexing structure comprises multiple optical filters, all the optical filters can be arranged on the side of the second transmitting surface 502 away from the second reflecting surface 302, so as to make the light be transmitted through the second transmitting surface 502 before being incident on each optical filter. Preferably, multiple optical filters are arranged on the third reflecting surface 503 in the form of patches.

Figure 12:
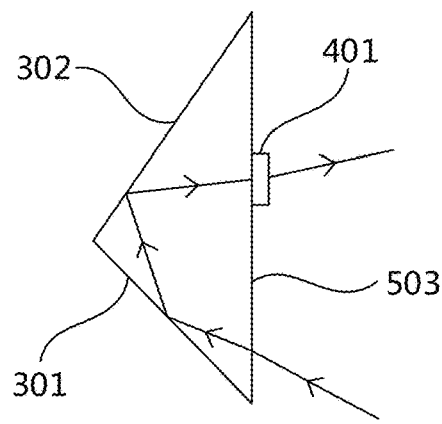
FIG. 12 is a side view of a wavelength division multiplexing structure with light exiting on the same side as the incident light provided in an embodiment of the present application.

In some optional embodiments, as shown in FIG. 12, the first reflecting surface 301, the second reflecting surface 302 and the third transmitting surface 503 are three sides of a triangular prism. Wherein, the three side edges of the triangular prism are parallel to each other. Thus, using the prism that comprises the first reflecting surface 301, the second reflecting surface 302 and the third transmitting surface 503 to provide the wavelength division multiplexing function, and using the prism that is comprised of innovative light path structure to realize the reversion transmission of the light combining path and light splitting path of WDM. Wherein, the light incident on the prism of the third transmitting surface 501 and enters the prism, and after being reflected twice, the light will be transmitted by the third transmitting surface 503 again before entering the optical filter.

Figure 13:
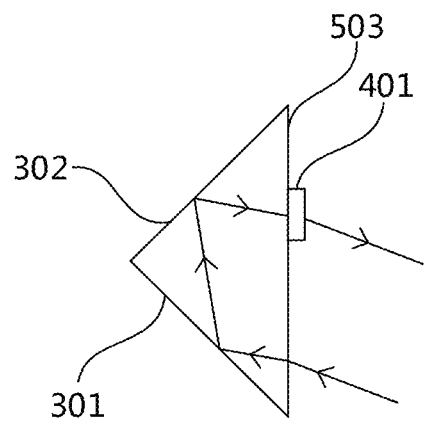
FIG. 13 is a side view of a wavelength division multiplexing structure with light exiting on the same side as the incident light provided in an embodiment of the present application.
Figure 14:
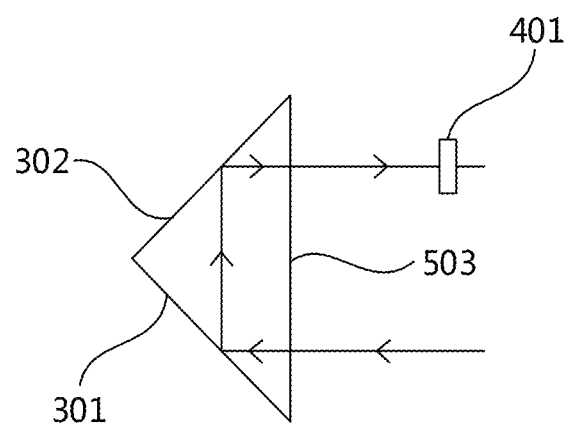
FIG. 14 is a side view of a wavelength division multiplexing structure with light exiting on the same side as the incident light provided in an embodiment of the present application.
Figure 15:
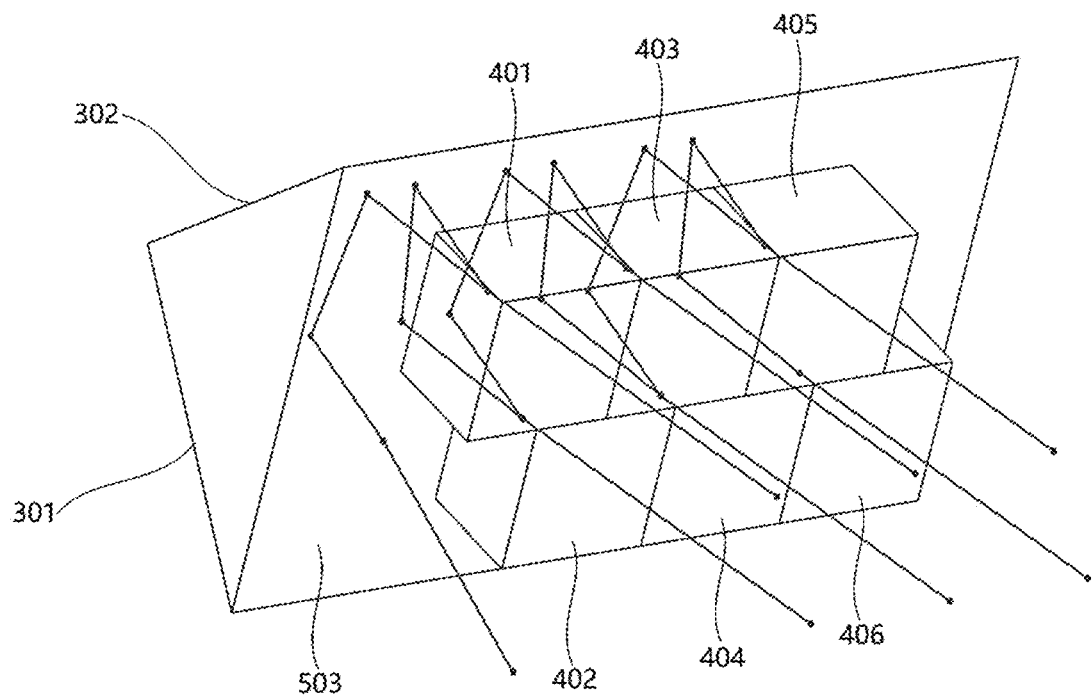
FIG. 15 is a schematic structural diagram of a wavelength division multiplexing structure according to an embodiment of the present application.

In some optional embodiments, as shown in FIG. 13, the cross-section of the triangular prism in the direction perpendicular to the side edges 601 is an isosceles right triangle. Thus, using the specific spatial light path composed of isosceles right-angle prism and dielectric optical filter to realize the wave combining and splitting effect.

In a practical application of the above embodiments, referring to FIG. 7, FIG. 8, FIG. 14 and FIG. 15, with a plane perpendicular to the side edges as a first plane 701 (when the top and bottom faces of the right-angle prism are perpendicular to the side edges, the first plane 701 can be either the top or the bottom faces of the right-angle prism), the light that is incident on the first reflecting surface 301 is not parallel to the side edges 601; and the acute angle formed between a projection of the light that is incident on the first reflecting surface 301 on the first plane 701 and the first reflecting surface 301 is 45°. Thus, when the acute angle formed between the projection of the light that is incident on the first reflecting surface 301 on the first plane 701 and the first reflecting surface 701 is 45°, the acute angle formed between the projection of the light that is reflected by the first reflecting surface 301 on the first plane 701 and the second reflecting surface 302 is also 45°, which is beneficial to realize the total reflection of light in practical applications. In the practical application, the optical filters have certain requirements on the incident angle of the light that is incident into the optical filters. After determining the incident angle, the included angle between the first reflecting surface 301 and the second reflecting surface 302 can be set as an appropriate angle to match the incident angle requirements of the optical filters.

Figure 8:
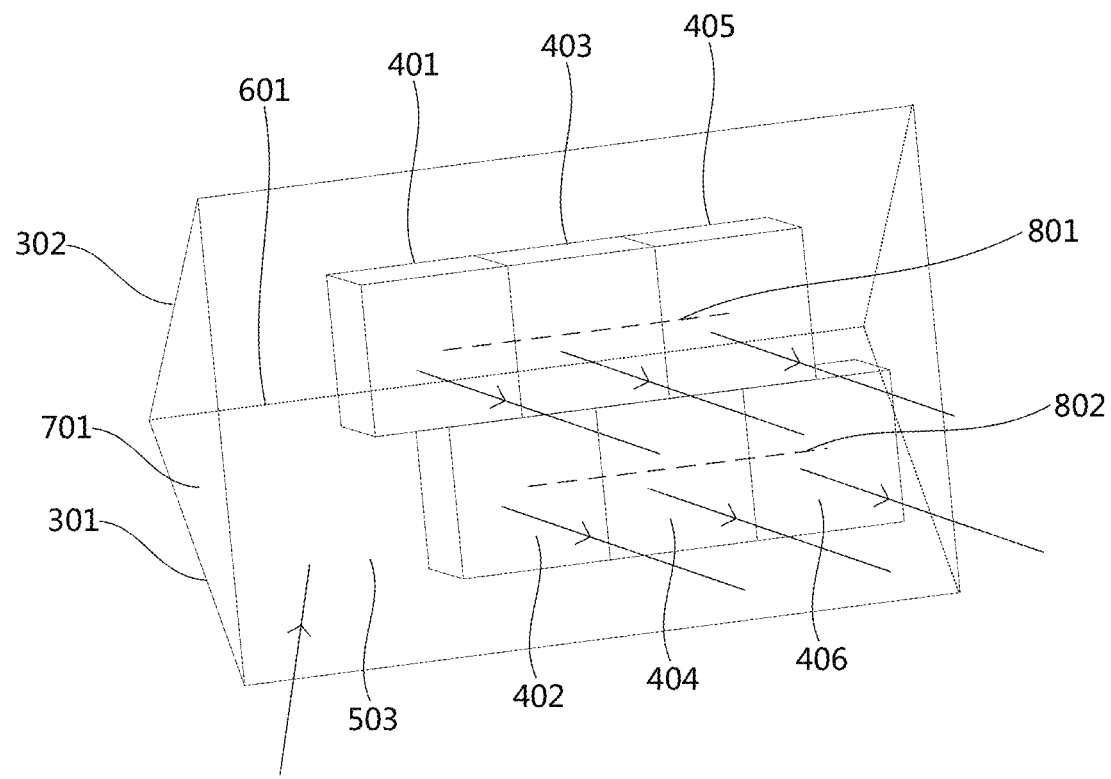
FIG. 8 is a schematic diagram of incident light and emergent light of a wavelength division multiplexing structure provided by an embodiment of the present application.

Referring to FIG. 7 and FIG. 8, the incident light, which is parallel to the bisector of the right angle but not coplanar, can be incident at an inclination angle to the side edges 601. Wherein, the inclination angle can be the common angle in optical communication industry, such as 8° or 13.5°. But the inclination angle cannot be 90°, which means the incident light cannot be incident from the direction perpendicular to the third transmitting surface 503. And because of the incident light is incident at an inclination angle, the emergent light and the incident light in the first C-shaped light path will have an offset along the direction of the side edges 601 of the prism, meanwhile, the emergent angle and the incident angle are equal to each other and are symmetric in direction. And since the first reflecting surface 301 and the second reflecting surface 302 are perpendicular to each other, all the emergent light transmitted by all optical filters are parallel to each other, and these emergent light are parallel to the projection of the original incident light on the first plane 701.

The optical filter in the embodiments of the application can be dielectric filter. In a practical application, the first optical filter 401 to the Nth optical filter are all dielectric filters.

In the embodiments of the application, the wavelength division multiplexing structure has strong expansibility, and based on the actual application requirements, the pretreatment device is used to realize all the incident light emitting on the different sides, and the pretreatment device can also be used to prevent the reflections occurring on the second reflecting surface 302. Since the partial pretreatment light path in which light is incident on the first optical filter coincides with the partial C-shaped light path in which light is incident on the first optical filter, the light that is incident into the pretreatment device can be split, and the light of different wavelengths can be combined and emitted from the pretreatment. The pretreatment device can change the transmission direction of the incident light by using different structures, so as to flexibly realize the incident light emitting on the same side or different sides.

In some optional embodiments, the pretreatment device comprises a prism 100, which does not intersect the second C-shaped light path. The prism technology is mature and widely used, users can choose the appropriate prism to change the direction of incident light in practical application, so as to meet the functioning demand.

In some optional embodiments, the refractive index of the prism is the same as that of the second reflecting surface, and the first side of the prism is attached to the second reflecting surface. The beneficial effect of the technical scheme is: the light that is incident from the prism on the second reflecting surface will not be reflected of refracted when the refraction index of the prism is the same as that of the second reflecting surface, so as to make users conveniently adjust the direction of the incident light.

In some optional embodiments, the pretreatment device further comprises an attenuator, which is arranged between the prism and the second reflecting surface; and the attenuator is used to control the intensity of light output from the attenuator. The beneficial effect of the technical scheme is: the intensity of the incident light of the second reflecting surface can be controlled by the attenuator.

In some optional embodiments, the attenuator comprises a first polarizer, a second polarizer, and a liquid crystal material that is arranged between the first and second polarizer. The beneficial effect of the technical scheme is: using two polarizers and liquid crystal materials to provide attenuation function, of which the process is mature and easy to realized.

In some optional embodiments, the attenuator performs an optical attenuation function by using an electro-absorption material. The beneficial effect of the technical scheme is: using the special properties of the electro-absorption materials to provide the attenuation function of light.

In some optional embodiments, the attenuator is used to provide an optical switching function. The beneficial effect of the technical scheme is: the pretreatment light path can be regarded as disconnected when the attenuator makes the intensity of the light attenuated to reach or close to 100%.

In some optional embodiments, the pretreatment device further comprises a switchable optical device, which is arranged between the prism and the second reflecting surface; the switchable optical device switches between a reflection state and a transmission state to provide an optical switching function, thereby makes the light in the pretreatment light path or the light in the first C-shaped light path enter the first optical filter. The beneficial effect of the technical scheme is: the 1×2 optical switching function is realized by switching the switchable optical device between the reflection state and transmission state; wherein, in the transmission state, light in the pretreatment light path transmits through the second reflecting surface and then enters the first optical filter; in the reflection state, light in the first C-shaped light path is reflected by the second reflecting surface and enters the first optical filter.

In some optional embodiments, the pretreatment device further comprises a variable refractive index device, which is arranged between the prism and the second reflecting surface; the variable refractive index device provides an optical switching function by using a variable refractive index material to make the light in the pretreatment light path or the light in the first C-shaped light path enter the first optical filter. The beneficial effect of the technical scheme is: the 1×2 optical switching function is realized by the variable of the refractive index of the variable refractive index materials, which makes the light in the pretreatment light path totally reflected instead of entering the first optical filter before the light is incident on the second reflecting surface, or makes the light that is reflected by the first reflecting surface in the first C-shaped light path directly transmit the second reflecting surface but not reflected to the first optical filter, so as to make the light in the pretreatment light path or the light in the first C-shaped light path enter the first optical filter.

In some optional embodiments, the pretreatment device further comprises a photodetector and a splitting film that is plated on the second side of the prism; the splitting film is used to split the light that is incident on the splitting film into a first portion and a second portion, the first portion is output to the second reflecting surface, and the second portion serves as an input source of the photodetector. The beneficial effect of the technical scheme is: using the splitting film to split the light, so as to detect the parameters of the light that is incident on the splitting film.

In some alternative embodiments, the pretreatment device may include a prism 100, and the prism 100 does not intersect with the second C-shaped light path. The prism process is mature, the application is wide, and in practical application, a user can select a proper prism 100 to change the direction of incident light, so that the requirements in use are met. The pretreatment means may comprise one or more prisms 100, the prisms 100 being, for example, triangular, quadrangular, pentagonal or other prisms. When prism 100 is a prism, it may be a right prism, preferably an isosceles right prism. It should be noted that the prism 100 intersects only the first C-shaped light path, so that the light in the pretreatment light path is transmitted to the first optical filter 401 from the intersection point of the first C-shaped light path and the second reflecting surface 302, and the prism 100 does not intersect with the second C-shaped light path, the third C-shaped light path, and other C-shaped light paths except the first C-shaped light path. Since the prism 100 and the second reflecting surface 302 are separately provided, a user can replace an appropriate prism according to the light path requirement in practical application. Compared with the mode of attaching a film layer for increasing and decreasing the reflectivity on the second reflecting surface 302, the prism 100 is convenient to take and replace and simple in process.

In some alternative embodiments, the refractive indexes of the prism 100 and the second reflecting surface 302 may be the same, and the first side surface 101 of the prism 100 and the second reflecting surface 302 are attached together, as shown in FIG. 2. When the refractive indexes of the prism 100 and the second reflecting surface 302 are the same, light is incident from the prism 100 to the second reflecting surface 302 without reflection, which is convenient for a user to adjust the direction of the light incident on the prism 100, so that the light is incident on the first optical filter 401 through the second reflecting surface 302 after being incident on the prism 100. In a specific implementation, the first side surface 101 and the second reflecting surface 302 of the prism 100 may be adhered together by using an optical cement, or adhered together by using a cement, and the prism 100 and the second reflecting surface 302 may be fixed together by a fixing device.

Figure 16:
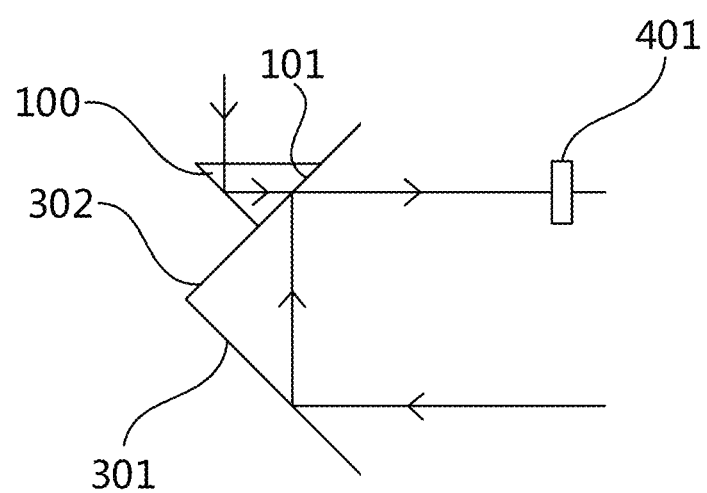
FIG. 16 is a side view of a wavelength division multiplexing structure provided by an embodiment of the present application.

In one implementation, the prism 100 may be a right prism, and the non-right-angled side surface of the right prism is bonded to the second reflecting surface 302 as the first side surface 101, as shown in FIG. 2, and light enters the pretreatment device from the opposite side of the emergent light and is transmitted from the prism 100 to the second reflecting surface 302. In another practical application, a right-angle side surface of the prism 100 is used as the first side surface 101 and is attached to the second reflecting surface 302, as shown in FIG. 16, in this case, light is also incident on the pretreatment device from the opposite side of the emergent light, and after incidence, the light is transmitted to the second reflecting surface 302 after being reflected once in the prism 100.

Figure 17:
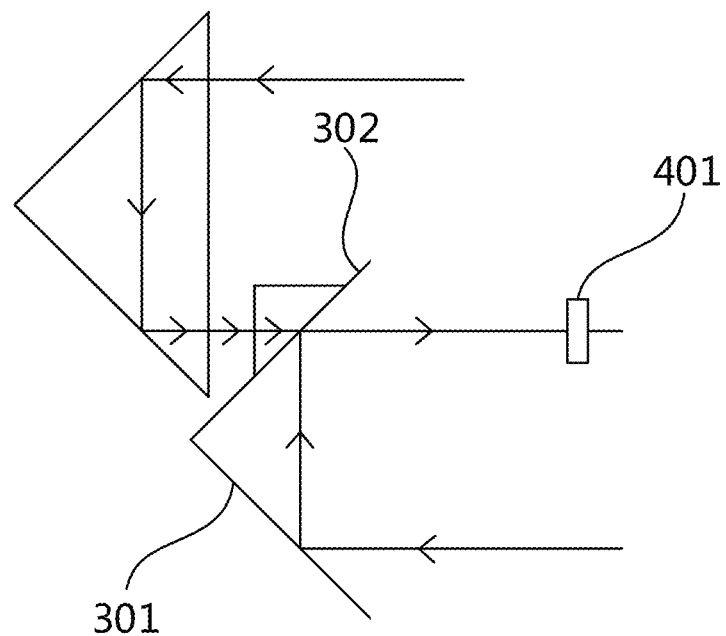
FIG. 17 is a side view of a wavelength division multiplexing structure with light exiting on the same side as the incident light provided in an embodiment of the present application.

In another practical application, the embodiment of the present application may further include other prisms to meet the light path requirements of the incident light and the emergent light in a specific application scenario. Referring to FIG. 17, the pretreatment device includes two prisms, and the function of emitting light from the same side as the incident light is realized by the combination of the prisms.

Figure 18:
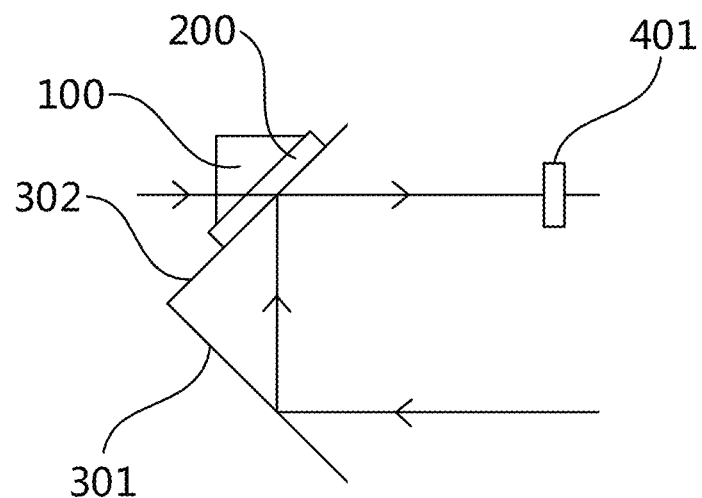
FIG. 18 is a side view of a wavelength division multiplexing structure with attenuation provided by an embodiment of the present application.

In some optional embodiments, referring to FIG. 18, the pretreatment device may further include an attenuator 200, the attenuator 200 is disposed between the prism 100 and the second reflecting surface 302, and the attenuator 200 is used to control the intensity of the light output from the attenuator 200. Thereby, the intensity of the light incident on the second reflecting surface 302 is controlled by the attenuator 200.

Figure 19:
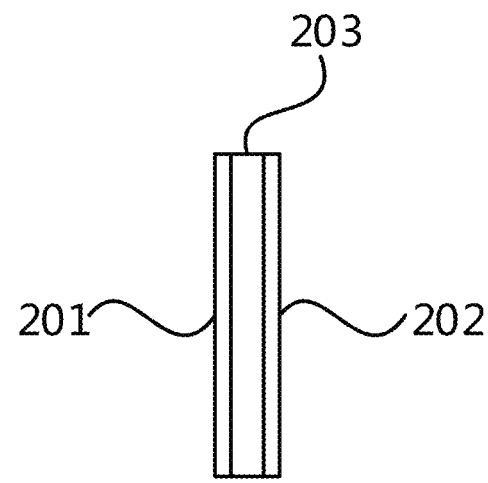
FIG. 19 is a side view of an attenuator provided in an embodiment of the present application.

In one implementation, referring to FIG. 19, the attenuator 200 may include a first polarizer 201, a second polarizer 202, and a liquid crystal material 203 disposed between the first polarizer 201 and the second polarizer 202. Therefore, the attenuation function is realized by using the two polaroids and the liquid crystal material, the process is mature, and the realization is easy.

In another implementation, the attenuator 200 may use an electro-absorption material to perform the light attenuation function. The electric absorption material is an absorption material with unique performance which is artificially manufactured by using the Stark effect of quantum restriction. The absorption edge is steep, the thermal stability is good, and when a proper reverse electric field is added, the exciton absorption peak can obviously move towards the long-wave direction, and the absorption spectrum can be reduced reversibly after the external electric field is canceled. This material is achieved by designing the composition and thickness of the wells and barriers and the periodicity of the layers of a multiple quantum well structure, known as "energy-band engineering". Thereby, the attenuation function of light is achieved by using the special properties of the electric absorbing material.

In some alternative embodiments, the attenuator 200 may be used to provide an optical switching function. For example, when the attenuator 200 attenuates the light by a proportion at or near 100%, it may be considered that the pretreatment light path is turned off.

Figure 20:
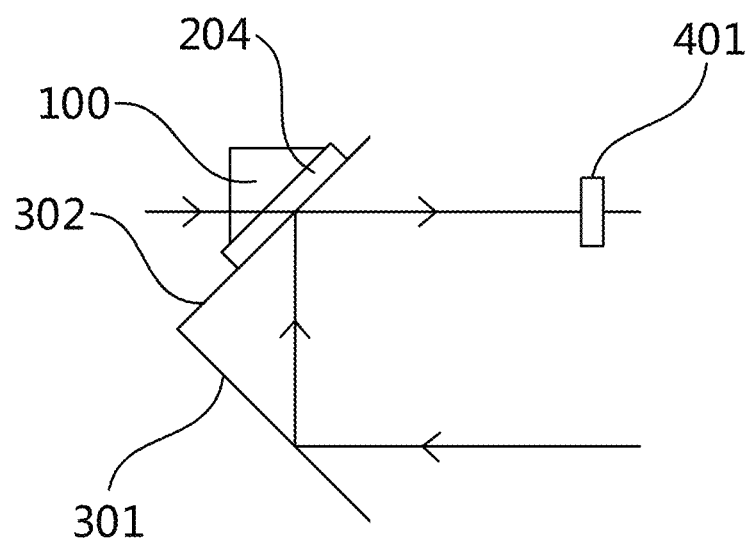
FIG. 20 is a side view of a wavelength division multiplexing structure with an optical switch according to an embodiment of the present application.

In some alternative embodiments, referring to FIG. 20, the pretreatment device may further include a switchable optical device 204, the switchable optical device 204 is disposed between the prism 100 and the second reflecting surface 302, the switchable optical device 204 is switched between a reflection state and a transmission state to provide a light switching function, so that the light in the pretreatment light path or the light in the first C-shaped light path is incident on the first optical filter 401. Thus, a 1×2 optical switching function is realized by switching the switchable optical device 204 between the reflection state and the transmission state, light in the pretreatment light path is transmitted through the second reflecting surface 302 and output to the first optical filter 401 when the switchable optical device 204 is in the transmission state, and light in the first C-shaped light path is reflected at the second reflecting surface 302 and output to the first optical filter 401 when the switchable optical device 204 is in the reflection state. In a specific implementation, the switchable optical device 204 is, for example, a switchable optical device of the light panel switchable between reflection and transmission states disclosed in patent CN1189224A.

Figure 21:
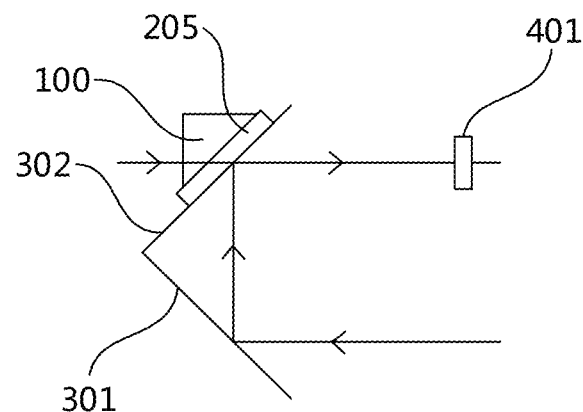
FIG. 21 is a side view of a wavelength division multiplexing structure with an optical switch according to an embodiment of the present application.

In some optional embodiments, referring to FIG. 21, the pretreatment device may further include a variable refractive index unit 205, the variable refractive index unit 205 is disposed between the prism 100 and the second reflecting surface 302, and the variable refractive index unit 205 provides an optical switching function by using a variable refractive index material, so that the light in the pretreatment light path or the light in the first C-shaped light path is incident on the first optical filter 401. The refractive index of the variable refractive index material is lower than that of the prism 100 and is continuously reduced until the light in the pretreatment light path is totally reflected before being incident on the second reflecting surface 302 and does not enter the first optical filter 401, or the refractive index of the variable refractive index material is equal to that of the second reflecting surface 302, so that the light reflected by the first reflecting surface 301 in the first C-shaped light path directly passes through the second reflecting surface 302 and cannot be reflected to the first optical filter 401, and thus, a 1×2 optical switch function is realized, and the light in the pretreatment light path or the light in the first C-shaped light path enters the first optical filter 401. It should be noted that when the refractive index of the variable refractive index material is higher than the refractive index of the second reflecting surface 302, a small amount of light reflected by the first reflecting surface 301 in the first C-shaped light path is reflected by the second reflecting surface 302, and if the reflected light is not enough to affect the use requirement that the light path is turned off, a small amount of reflected light may exist, that is, the condition that the first C-shaped light path is turned off may be relaxed until the refractive index of the variable refractive index material is equal to or higher than the refractive index of the second reflecting surface 302, depending on the turn-off specification requirement of the optical switch.

Figure 22:
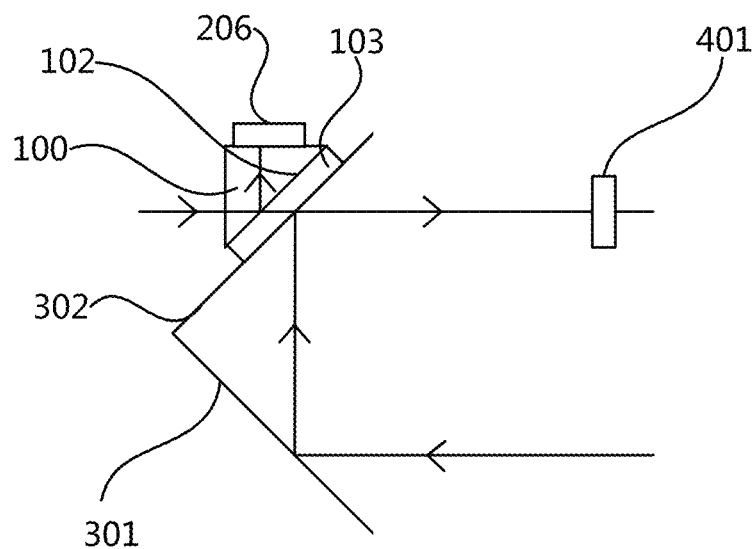
FIG. 22 is a side view of a wavelength division multiplexing structure with a light splitting detection function according to an embodiment of the present application.

In some optional embodiments, referring to FIG. 22, the pretreatment apparatus further includes a photodetector 206, and a splitting film 103 coated on the second side surface 102 of the prism 100, wherein, the splitting film 103 is used for splitting the light incident on the splitting film 103 into a first portion and a second portion, the first portion is output to the second reflecting surface 302, and the second portion is used as an input source of the photodetector 206. Thereby, the spectroscopic film 103 performs spectroscopic to detect a parameter of the light incident on the spectroscopic film 103, for example, a power parameter. Wherein, the second side 102 of the prism 100 may be identical to the first side 101.

The foregoing description and drawings are only for purposes of illustrating the preferred embodiments of the present application and are not intended to limit the present application, which is, therefore, to the contrary, the intention is to cover all modifications, equivalents, and alternatives falling within the spirit and scope of the present application.

The invention claimed is:

1. A wavelength division multiplexing structure, characterized in that comprising:
    a first reflecting surface;
    a second reflecting surface; the plane of the first reflecting surface intersects the plane of the second reflecting surface;
    a first optical filter, which is used to partially transmit and partially reflect the light that is incident on the first optical filter; wherein, the light transmitted through the first optical filter has a first wavelength;
    a second optical filter, which is used to partially transmit and partially reflect the light that is incident on the second optical filter; wherein, the light transmitted through the second optical filter has a second wavelength;
    a pretreatment device, which is arranged on one side of the second reflecting surface away from the first optical filter, is used to control the direction of the input and output light;
    the light that is incident on the first reflecting surface is reflected by the first and the second reflecting surface in sequence to form a first C-shaped light path in C-shaped or approximately C-shaped, finally enters the first optical filter; and in the first C-shaped light path, the light that is incident on the first reflecting surface is not coplanar with the light reflected by the second reflecting surface;
    the light that is incident on the pretreatment device sequentially transmits through the pretreatment device and the second reflecting surface to form a pretreatment light path, finally enters the first optical filter; the partial pretreatment light path in which light is incident on the first optical filter from the second reflecting surface, coincides with the partial C-shaped light path in which light is incident on the first optical filter from the second reflecting surface;

the light reflected by the first optical filter is reflected by the second reflecting surface and the first reflecting surface in sequence to form a second C-shaped light path in C-shaped or approximate C-shaped and finally enters the second optical filter.

2. The wavelength division multiplexing structure according to claim 1, characterized in that the pretreatment device comprises a prism, which does not intersect the second C-shaped light path.

3. The wavelength division multiplexing structure according to claim 2, characterized in that the refractive index of the prism is the same as that of the second reflecting surface, and the first side of the prism is attached to the second reflecting surface.

4. The wavelength division multiplexing structure according to claim 2, characterized in that the pretreatment device further comprises an attenuator, which is arranged between the prism and the second reflecting surface; and the attenuator is used to control the intensity of light output from the attenuator.

5. The wavelength division multiplexing structure according to claim 4, characterized in that the attenuator comprises a first polarizer, a second polarizer, and a liquid crystal material that is arranged between the first and second polarizer.

6. The wavelength division multiplexing structure according to claim 4, characterized in that the attenuator performs an optical attenuation function by using an electro-absorption material.

7. The wavelength division multiplexing structure according to claim 4, characterized in that the attenuator is used to provide an optical switching function.

8. The wavelength division multiplexing structure according to claim 2, characterized in that the pretreatment device further comprises a switchable optical device, which is arranged between the prism and the second reflecting surface; the switchable optical device switches between a reflection state and a transmission state to provide an optical switching function, thereby makes the light in the pretreatment light path or the light in the first C-shaped light path enter the first optical filter.

9. The wavelength division multiplexing structure according to claim 2, characterized in that the pretreatment device further comprises a variable refractive index device, which is arranged between the prism and the second reflecting surface; the variable refractive index device provides an optical switching function by using a variable refractive index material to make the light in the pretreatment light path or the light in the first C-shaped light path enter the first optical filter.

10. The wavelength division multiplexing structure according to claim 2, characterized in that the pretreatment device further comprises a photodetector and a splitting film that is plated on the second side of the prism; the splitting film is used to split the light that is incident on the splitting film into a first portion and a second portion, the first portion is output to the second reflecting surface, and the second portion serves as an input source of the photodetector.

11. The wavelength division multiplexing structure according to claim 1, characterized in that the wavelength division multiplexing structure further comprises third to Nth optical filters, wherein, N is an integer greater than 2;
when N is odd:
the light reflected by the 2P−1th optical filter is reflected by the second reflecting surface and the first reflecting surface in sequence to form a 2Pth C-shaped light path in C-shaped or approximately C-shaped and finally enters the 2Pth optical filter; wherein, p is a positive integer, and 2P+1≤N;

the 2Pth optical filter is used to partial transmit and partial reflect the light that is incident on the 2Pth optical filter; wherein, the light transmitted through the 2Pth optical filter is of the 2Pth wavelength;

the light reflected by the 2Pth optical filter is reflected by the first reflecting surface and the second reflecting surface in sequence to form a 2P+1 C-shaped light path in C-shaped or approximately C-shaped and finally enters the 2P+1th optical filter;

the 2P+1th optical filter is used to partial transmit and partial reflect the light that is incident on the 2P+1th optical filter; wherein, the light transmitted through the 2P+1th optical filter has the 2P+1th wavelength;

when N is even:
the light reflected by the 2Qth optical filter is reflected by the first reflecting surface and the second reflecting surface in sequence to form a 2Q+1th C-shaped light path in C-shaped or approximately C-shaped and finally enters the 2Q+1th optical filter; wherein, q is a positive integer, and 2Q+2th≤N;

the 2Q+1th optical filter is used to partial transmit and partial reflect the light that is incident on the 2Q+1th optical filter; wherein, the light transmitted through the 2Q+1th optical filter has the 2Q+1th wavelength;

the light reflected by the 2Q+1th optical filter is reflected by the second reflecting surface and the first reflecting surface in sequence to form a 2Q+2th C-shaped light path in C-shaped or approximately C-shaped and finally enters the 2Q+2th optical filter;

the 2Q+2th optical filter is used to partial transmit and partial reflect the light that is incident on the 2Q+2th optical filter; wherein, the light transmitted through the 2Q+2th optical filter has the 2Q+2th wavelength.

12. The wavelength division multiplexing structure according to claim 11, characterized in that the first reflecting surface is perpendicular to the second reflecting surface;
when N is odd, the centers of the first optical filter, the third to the Nth optical filter are sequentially connected to form a first connecting line; the centers of the second optical filter, the fourth to the N−1th optical filter are sequentially connected to form a second connecting line; the first connecting line and the second connecting line are two parallel straight lines;

when N is even, the centers of the first optical filter, the third to the N−1th optical filter are sequentially connected to form a third connecting line; the centers of the second optical filter, the fourth to the N−1th optical filter are sequentially connected to form a fourth connecting line; the third connecting line and the fourth connecting line are two parallel straight lines.

13. The wavelength division multiplexing structure according to claim 1, characterized in that the wavelength division multiplexing structure further comprises a first transmitting surface;
the light that is incident on the first transmitting surface is transmitted through the first transmitting surface, reflected by the first reflecting surface and reflected by the second reflecting surface in sequence and finally enters the first optical filter.

14. The wavelength division multiplexing structure according to claim 1, characterized in that the wavelength division multiplexing structure further comprises a second transmitting surface;

the first optical filter is arranged on one side of the second transmitting surface away from the second reflecting surface;

the light that is incident on the first reflecting surface is reflected by the first reflecting surface, reflected by the second reflecting surface and transmitted through the second transmitting surface in sequence and finally enters the first optical filter.

15. The wavelength division multiplexing structure according to claim 1, characterized in that the wavelength division multiplexing structure further comprises a third transmitting surface;

the first optical filter is arranged on one side of the third transmitting surface away from the second reflecting surface;

the light that is incident on the third transmitting surface is transmitted through the third transmitting surface, reflected by the first reflecting surface, reflected by the second reflecting surface and transmitted through the third transmitting surface in sequence and finally enters the first optical filter.

16. The wavelength division multiplexing structure according to claim 15, characterized in that the first reflecting surface, the second reflecting surface and the third transmitting surface are three sides of a triangular prism; wherein, the three side edges of the triangular prism are parallel to each other.

17. The wavelength division multiplexing structure according to claim 16, characterized in that the first reflecting surface is perpendicular to the second reflecting surface.

18. The wavelength division multiplexing structure according to claim 17, characterized in that the cross-section of the triangular prism in the direction perpendicular to the side edges is an isosceles right triangle.

19. The wavelength division multiplexing structure according to claim 18, characterized in that with a plane perpendicular to the side edges as a first plane, the light that is incident on the first reflecting surface is not parallel to the side edges; and an acute angle formed between a projection of the light that is incident on the first reflecting surface on the first plane and the first reflecting surface is 45°.

\* \* \* \* \*